1,565,533

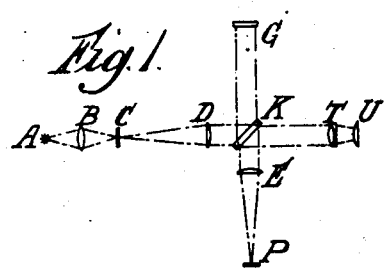
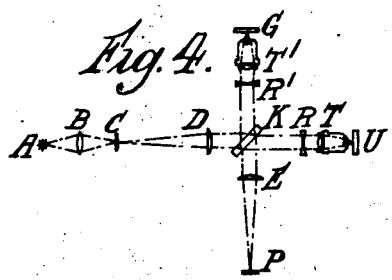
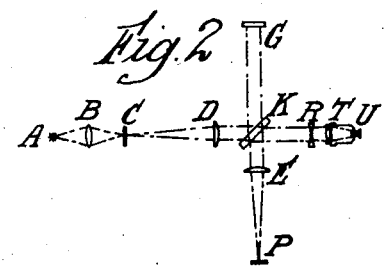
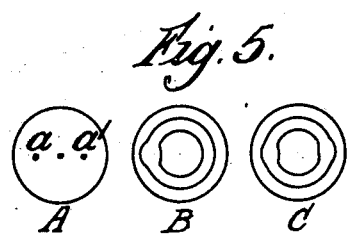
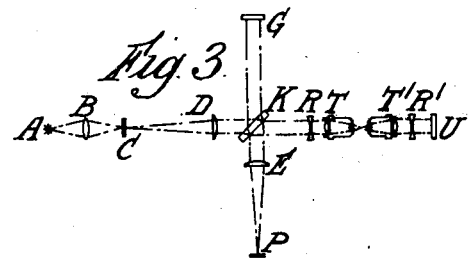
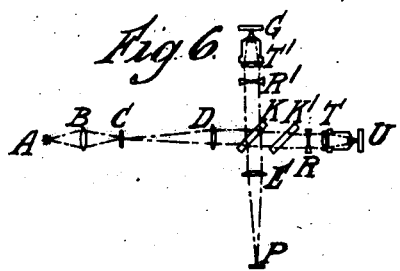
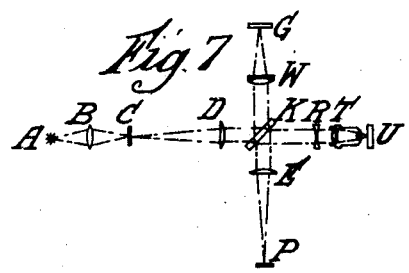
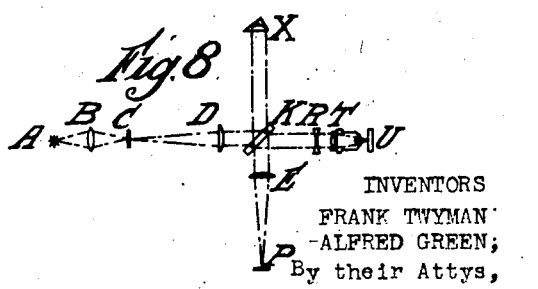
INVENTORS
FRANK TWYMAN
ALFRED GREEN;
By their Attys, Patented Dec. 15, 1925.

UNITED STATES PATENT OFFICE.

FRANK TWYMAN AND ALFRED GREEN, OF LONDON, ENGLAND, ASSIGNORS TO ADAM HILGER, LIMITED, OF LONDON, ENGLAND.

MANUFACTURE OF LENSES AND IN APPARATUS THEREFOR.

Application filed November 10, 1923. Serial No. 674,032.

*To all whom it may concern:*

Be it known that we, FRANK TWYMAN and ALFRED GREEN, both subjects of the King of Great Britain, residing at 75ª Camden Road, London, England, have invented new and useful Improvements in the Manufacture of Lenses and in Apparatus Therefor, of which the following is a specification.

This invention relates to improvements in the manufacture or testing of lenses or combinations of lenses, particularly those used as objectives in microscopes, and in apparatus therefor.

The object of this invention is to provide a method of testing and correcting the imperfections of an objective and more particularly to provide a method whereby the faults due to aberration can be measured.

The method and apparatus employed are modifications of those described in the specification of our former United States Patent No. 1,252,512. In the method referred to, a beam of light is passed through the objective in such a way as to produce a series of interference rings or fringes which constitute what may be called a "contour map" of the imperfections.

According to this invention light from a suitable source is collimated and then passes to a plane parallel glass plate which is partially silvered so that a part of the light is reflected and a part transmitted by it, the reflected part of the light passing to a reflecting system which may consist of a lens corrected for spherical aberration in the focus of which is placed a plane mirror by which it is reflected back to the plate, whilst the transmitted part of the light passes through a negative lens to the objective and from thence to a preferably plane mirror by which it is reflected back through the objective and lens to the plate where it combines with the reflected light, the two images being brought to a focus at the eye so that they may be brought into coincidence by observation with an eyepiece. On the removal of the eyepiece and if the objective is not perfect or not in perfect adjustment, an interference pattern will in general be observed which forms a contour map of the imperfections.

The lens referred to above between the plane parallel glass plate and the objective is corrected for spherical aberration and its focal length and position relatively to the microscopic objective are such that rays which are parallel on incidence emerge as if coming from a point corresponding with the "tube length" for which the objective is to be corrected.

If the microscopic objective is to be used with an immersion liquid, such as cedar wood oil or glycerine and water, or with a plate of glass (cover glass) which is placed between it and the object to be observed, the space between the mirror and the microscopic objective may be filled with the liquid or may have a similar piece of glass inserted between it and the objective.

In place of the reflecting system described above, a tetragonal prism of the kind known as a corner cube prism may be employed which must be so adjusted that the axial ray of the pencil of light incident upon the prism is reflected back upon its own path, in which case the other rays forming the pencil will be reflected back in paths parallel with their direction of incidence and symmetrical with their position on incidence relative to the axial ray.

Alternatively a drop of mercury forming a spherical convex mirror may be substituted for the plane mirror adjacent to the microscopic objective, in which case the reflecting system in the other beam is replaced by a plane mirror.

The accompanying drawings illustrate diagrammatically apparatus made in accordance with this invention.

Figure 1 is a diagram showing the type of interferometer used. Figure 2 is a diagram of one arrangement of the apparatus. Figures 3 and 4 are diagrams of other arrangements of the apparatus when the objective to be tested is compared with a standard objective. Figure 5 shows a diagram of the wave front. Figures 6 and 7 show other modifications. Figure 8 is a diagram of an apparatus in which a tetragonal prism is employed in place of a mirror.

In all the figures of the drawings a collimated beam of monochromatic light from a source of light A passes through a condensing lens B to a diaphragm C and thence to an achromatic lens D.

In the lens interferometer described in the United States Patent No. 1,253,308 which is shown in diagram in Figure 1, a collimated beam of monochromatic light is separated into two beams at the transmissively silvered surface of a plate of plane parallel glass K. The transmitted beam, which may be called briefly the test beam, passes through the lens T under test, and is reflected back from the surface of the convex mirror U, which is so disposed as nearly to coincide with the approximately spherical wave front of the light as it converges after passage through the lens T. Thus, after reflection and passage back through the lens under test the wave front of the returning beam is approximately plane.

The second beam, which may be called the comparison beam, is reflected back along its own path by the mirror G, so that the two beams recombine at the silvered surface of the plate K, and pass on together through the lens E which concentrates them on the eye of the observer situated at P. The observer then sees an interference pattern apparently located on the surface of the lens under test, and this pattern is a contour map, to a scale of half wave lengths of the light used, of the aberrations of wave surface occasioned by passage through the lens T of a plane wave. The arrangement may be modified by the use of a concave mirror instead of the convex one.

If such an instrument be provided with sufficiently delicate adjustments for focussing the objective under test (namely, moving it to and from the mirror U), and for moving the mirror U laterally, it becomes immediately suitably for exhibiting the aberrations possessed by a microscope objective when the latter is focussed to produce its real image at infinity. If, as is customary, the objective is intended to produce a real image at a finite distance, such a condition is simulated by the introduction of the negative lens R (see Figure 2) which is part of the present invention, corrected for spherical aberration and called, conformably to the nomenclature of the microscopist, the tube length lens. This lens must give to a parallel beam a divergence exactly corresponding to the convergence of the beam which obtains in the intended use of the objective.

The polishing of a concave mirror with sufficient precision not to introduce objectionable aberrations of its own becomes very difficult in the case of objectives of high numerical aperture, while if a convex mirror be attempted it needs to be of very small size, and is on that account very difficult to produce accurately by ordinary procedure. A small drop of mercury may be used as a convex mirror. In this case also the observer has no direct way of assuring himself that the surface of the drop is sufficiently spherical, and other modifications have therefore been devised, whereby the use of spherical mirrors can be obviated.

Figures 3 and 4 show arrangements in which the objective to be tested is compared with a second one (not necessarily identical) which may be regarded as a standard. In Figure 3 the standard objective T' is in line with that under test, together with a second tube length lens R', while in Figure 4 the standard objective and its tube length lens are put in the comparison beam. In the arrangement, Figure 3, the interference pattern represents the sum of the aberrations of the two objectives, while in Figure 4 it represents their difference. In either case flat mirrors suffice in both the test and comparison beams. It will be seen that in Figure 4 each ray returns, not along its first course, but along another course axially symmetrical with the first. This has the disadvantage that only in the case of an objective whose aberrations are axially symmetrical does the interference pattern represent the aberration truly the aberration of wave front shown at two axially symmetrical points ($a$ and $a'$, Figure 5$^A$) being in each case that due to the passage of a ray through $a$ in one direction and $a'$ in the other direction. Thus a distribution of aberration, due, for instance, to a local defect truly as shown in Figure 5$^B$, would appear in the interference picture as in Figure 5$^C$. The arrangement in Figure 4 has the advantage that the optical elements traversed by the beams in the test and the comparison beams being more nearly alike than in any of the former arrangements shown, it is possible to get more illumination simultaneously with distinct interference patterns. This is true in an enhanced degree in the arrangement of Figure 6 where the two paths have been made equal by introduction of a compensating plate K' (identical with K). Where, then, it is desired to get photographic records of aberrations of a number of objectives of similar focal length, the arrangement of Figure 6, supplemented by an ocular examination for non-symmetrical faults by the arrangements of Figures 2 or 3, has much to recommend it.

Instead of the comparison objective T', tube length lens R', and mirror G in Figure 4, a lens W of comparatively long focus (50 or 100 mm. for instance) corrected for spherical aberration, and with a flat mirror in its principal focus, can be used, as in Figure 7.

Figure 8 shows an arrangement in which no curved surfaces come into question other than those in the tube length lens and those of the objective under test. The lens W and mirror G are replaced by a tetragonal or "corner cube" prism. Such a prism has the well known property that every ray incident upon it is sent back parallel to its own path.

It has also the further property that the incident and reflected rays are precisely symmetrical with each other relatively to that ray which meets the apex of the prism.

The interference rings observed from a contour map of the imperfections may be removed by the methods described in the specification of our former Patent No. 1,252,512.

What we claim is:—

1. In the manufacture of lenses, dividing a beam of light into two parts, passing one part through a negative lens, the virtual focus of the negative lens being coincident with one of the conjugate foci of the lens under test through the lens under test, and then combining the two parts and causing the resulting beam to converge to a focus, thus producing interference rings arranged in the form of a contour map of the imperfections.

2. In the manufacture of lenses, dividing a beam of light into two parts, passing one part through a negative lens, the virtual focus of the negative lens being coincident with one of the conjugate foci of the lens under test through the lens under test, then combining the two parts and causing the resulting beam to converge to a focus, thus producing interference rings arranged in the form of a contour map of the imperfections, and then treating the lens to remove the imperfections.

3. In the manufacture of lenses, dividing a beam of light into two parts, passing one part through a negative lens corrected for spherical aberration, the virtual focus of the negative lens being coincident with one of the conjugate foci of the lens under test and so arranged relatively to the lens under test that its focal length and position are such that rays which are parallel on incidence emerge as if coming from the point for which the lens is to be corrected, through the lens under test, then combining the two parts and causing the resulting beam to converge to a focus, thus producing interference rings arranged in the form of a contour map of the imperfections, and then treating the lens to remove the imperfections.

4. An apparatus for testing lenses, comprising a plane parallel glass plate partially silvered and adapted to reflect part of a beam of light and to transmit a part, two mirrors adapted to reflect the light back to the plate and mounted so that their distances from the plate can be varied, means for maintaining the lens to be tested and a negative lens in the path of light to and from one of said mirrors the virtual focus of the negative lens being coincident with one of the conjugate foci of the lens under test.

5. An apparatus for testing lenses, comprising a plane parallel glass plate partially silvered and adapted to reflect part of a beam of light and to transmit a part, two mirrors adapted to reflect the light back to the plate and mounted so that their distances from the plate can be varied, means for maintaining the lens to be tested and a negative lens in the path of light to and from one of said mirrors, the virtual focus of the negative lens being coincident with one of the conjugate foci of the lens under test the negative lens being corrected for spherical aberration and so arranged relatively to the lens under test that its focal length and position are such that rays which are parallel on incidence emerge as if coming from the point for which the lens is to be connected.

6. An apparatus for testing lenses, comprising a plane parallel glass plate partially silvered and adapted to reflect part of a beam of light and to transmit a part, two mirrors adapted to reflect the light back to the plate and mounted so that their distances from the plate can be varied, means for maintaining the lens to be tested and a negative lens in the path of light to and from one of said mirrors, the virtual focus of the negative lens being coincident with one of the conjugate foci of the lens under test, and means for bringing both parts of the beam to a focus.

7. An apparatus for testing lenses, comprising a plane parallel glass plate partially silvered and adapted to reflect part of a beam of light and to transmit a part, two mirrors adapted to reflect the light back to the plate and mounted so that their distances from the plate can be varied, means for maintaining the lens to be tested and a negative lens in the path of light to and from one of said mirrors, the virtual focus of the negative lens being coincident with one of the conjugate foci of the lens under test, the negative lens being corrected for spherical aberration and so arranged relatively to the lens under test that its focal length and position are such that rays which are parallel on incidence emerge as if coming from the point for which the lens is to be corrected, and means for bringing both parts of the beam to a focus.

8. An apparatus for testing lenses, comprising a member partially silvered and adapted to reflect part of a beam of light and to transmit a part, two mirrors adapted to reflect the light back to the member and mounted so that their distances from the member can be varied, means for maintaining the lens to be tested and a negative lens in the path of light to and from one of said mirrors, the virtual focus of the negative lens being coincident with one of the conjugate foci of the lens under test.

9. An apparatus for testing lenses, comprising a member partially silvered and adapted to reflect part of a beam of light and to transmit a part, two mirrors adapted to reflect the light back to the member and mounted so that their distances from the member can be varied, means for maintaining the lens to be tested and a negative lens in the path of light to and from one of said mirrors, the negative lens being corrected for spherical aberration and so arranged relatively to the lens under test that its focal length and position are such that rays which are parallel on incidence emerge as if coming from the point for which the lens is to be corrected, the virtual focus of the negative lens being coincident with one of the conjugate foci of the lens under test.

10. An apparatus for testing lenses, comprising a member partially silvered and adapted to reflect part of a beam of light and to transmit a part, two mirrors adapted to reflect the light back to the member and mounted so that their distances from the member can be varied, means for maintaining the lens to be tested and a negative lens in the path of light to and from one of said mirrors, the virtual focus of the negative lens being coincident with one of the conjugate foci of the lens under test, and means for bringing both parts of the beam to a focus.

11. In the manufacture of lenses, dividing a beam of light into two parts, passing one part through a negative lens corrected for spherical aberration, the virtual focus of the negative lens being coincident with one of the conjugate foci of the lens under test and the negative lens being so arranged relatively to the lens under test that its focal length and position are such that rays which are parallel on incidence emerge as if coming from the point for which the lens is to be corrected, through the lens under test, and then combining the two parts and causing the resulting beam to converge to a focus, thus producing interference rings arranged in the form of a contour map of the imperfections.

In testimony that we claim the foregoing as our invention we have signed our names this 25th day of October, 1923.

FRANK TWYMAN.
ALFRED GREEN.